(12) United States Patent
Liu

(10) Patent No.: US 10,680,790 B2
(45) Date of Patent: Jun. 9, 2020

(54) ANTENNA SYSTEM

(71) Applicant: Huawei Technologies Co., Ltd., Shenzhen (CN)

(72) Inventor: Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 377 days.

(21) Appl. No.: 15/466,145

(22) Filed: Mar. 22, 2017

(65) Prior Publication Data

US 2017/0195108 A1 Jul. 6, 2017

Related U.S. Application Data

(63) Continuation of application No. PCT/CN2014/087133, filed on Sep. 22, 2014.

(51) Int. Cl.
*H01Q 1/52* (2006.01)
*H04L 5/14* (2006.01)
(Continued)

(52) U.S. Cl.
CPC ......... *H04L 5/1461* (2013.01); *H01Q 1/2291* (2013.01); *H01Q 1/24* (2013.01);
(Continued)

(58) Field of Classification Search
CPC ........ H01Q 1/242; H01Q 1/125; H01Q 1/246; H04L 5/1461
See application file for complete search history.

(56) References Cited

U.S. PATENT DOCUMENTS 7,817,641 B1 * 10/2010 Khandani ............ H04B 7/0682
370/395.4
2009/0066596 A1 3/2009 Fujishima et al.
(Continued)

FOREIGN PATENT DOCUMENTS

CN 1251483 A 4/2000
CN 102544772 A 7/2012
(Continued)

OTHER PUBLICATIONS

Zhou, M. et al., "Transmit-Receive Antenna Pair Selection in Full Duplex Systems," IEEE Wireless Communications Letters, vol. 3, No. 1, Feb. 2014, pp. 34-37.
(Continued)

*Primary Examiner* — Hoang V Nguyen
(74) *Attorney, Agent, or Firm* — Slater Matsil, LLP

(57) ABSTRACT

An antenna system, including: M transmit antenna pairs, where two transmit antennas of each transmit antenna pair are symmetrically distributed on both sides of a same symmetry axis; N receive antenna pairs, where two receive antennas of each receive antenna pair are symmetrically distributed on both sides of the symmetry axis; M dividing devices, which are one-to-one corresponding to the M transmit antenna pairs, and each dividing device is configured to: divide one transmit signal into two transmit signals and separately send the two transmit signals to a corresponding transmit antenna pair; and N combining devices, which are one-to-one corresponding to the N receive antenna pairs. Each combining device is configured to combine two receive signals received by a corresponding receive antenna pair into one receive signal. One of the dividing device and the combining device is an in-phase dividing device, and the other is an out-of-phase combining device.

8 Claims, 6 Drawing Sheets

(51) Int. Cl.
*H04B 1/525* (2015.01)
*H01Q 1/22* (2006.01)
*H01Q 1/24* (2006.01)
*H04B 7/04* (2017.01)
*H01Q 21/06* (2006.01)

(52) U.S. Cl.
CPC ............. *H01Q 1/525* (2013.01); *H04B 1/525* (2013.01); *H04B 7/04* (2013.01); *H01Q 1/246* (2013.01); *H01Q 21/061* (2013.01)

(56) References Cited

U.S. PATENT DOCUMENTS

| | | | |
|---|---|---|---|
| 2012/0147790 A1 | 6/2012 | Khojastepour et al. | |
| 2012/0154249 A1* | 6/2012 | Khojastepour | H01Q 3/2605 |
| | | | 343/893 |
| 2012/0201153 A1 | 8/2012 | Bharadia et al. | |
| 2015/0295308 A1 | 10/2015 | Liu et al. | |

FOREIGN PATENT DOCUMENTS

| | | |
|---|---|---|
| CN | 202978823 U | 6/2013 |
| CN | 103392263 A | 11/2013 |
| CN | 103401079 A | 11/2013 |
| CN | 103701510 A | 4/2014 |
| EP | 0994567 A2 | 4/2000 |

OTHER PUBLICATIONS

Hongliang, B. et al., "Simultaneous Co-Frequency Full-Duplex Technology Research," Journal of Telecommunication Technology, Telecommunications Technology, the editorial department mailbox, Dec. 2013, 5 pages.

Aryafar, E., et al., "MIDU: Enabling MIMO Full Duplex," MobiCom '12, Aug. 22-26, 2012, Istanbul, Turkey, 12 pages.

Choi, J., et al., "Achieving Single Channel, Full Duplex Wireless Communication," MobiCom '10, Sep. 20-24, 2010, Chicago, Illinois, 12 pages.

* cited by examiner

ANTENNA SYSTEM

CROSS-REFERENCE TO RELATED APPLICATIONS

This application is a continuation of International Application No. PCT/CN2014/087133, filed on Sep. 22, 2014, the disclosure of which is hereby incorporated by reference in its entirety.

TECHNICAL FIELD

The present application relates to the field of wireless communications technologies, and in particular, to an antenna system.

BACKGROUND

In a wireless communications system such as a mobile cellular communications system, a wireless local area network (WLAN for short), or fixed wireless access (FWA for short), communications nodes such as a base station (BS for short) or an access point (AP for short), a relay station (RS for short), and user equipment (UE for short) are generally capable of transmitting their own signals and receiving signals from other communications nodes. Because a radio signal greatly attenuates on a radio channel, compared with a transmit signal of a receive end, a signal from a communications peer becomes extremely weak when arriving at the receive end. For example, a power difference between a transmit signal and a receive signal of a communications node in the mobile cellular communications system reaches 80 dB to 140 dB or even greater. Therefore, to prevent a receive signal from being blocked or interfered by a transmit signal of a same transceiver, different frequency bands or time periods are used to transmit a radio signal and receive a radio signal, that is, a frequency division duplex (FDD for short) manner or a time division duplex (TDD for short) manner is used.

To improve frequency spectrum efficiency, a full-duplex technology may be used in the prior art. In a wireless full-duplex technology that is different from an existing FDD or TDD technology, transmitting and receiving operations may be simultaneously performed on a same radio channel. In this way, theoretically, frequency spectrum efficiency of the wireless full-duplex technology is two times as much as that of the FDD or TDD technology. A premise for implementing wireless full duplex is that strong interference (referred to as Self-interference) to a receive signal from a transmit signal of a same transceiver is avoided, reduced, and eliminated as much as possible, so that properly receiving a wanted signal is not affected by the strong interference.

SUMMARY

Embodiments of the present application provide an antenna system, so as to resolve a technical problem of relatively large antenna self-interference in the prior art.

A first aspect of the present application provides an antenna system. The system includes M transmit antenna pairs, where two transmit antennas of each transmit antenna pair in the M transmit antenna pairs are symmetrically distributed on both sides of a same symmetry axis, and M is a positive integer. The system also includes N receive antenna pairs, where two receive antennas of each receive antenna pair in the N receive antenna pairs are symmetrically distributed on both sides of the symmetry axis, and N is a positive integer. The system also includes M dividing devices, where the M dividing devices are one-to-one corresponding to the M transmit antenna pairs, and each dividing device is configured to: divide one transmit signal into two transmit signals and separately send the two transmit signals to two transmit antennas of a corresponding transmit antenna pair. The system also includes N combining devices, where the N combining devices are one-to-one corresponding to the N receive antenna pairs; each combining device is configured to combine two receive signals received by two receive antennas of a corresponding receive antenna pair into one receive signal; and the dividing device is an in-phase dividing device, and the combining device is an out-of-phase combining device; or the dividing device is an out-of-phase dividing device, and the combining device is an in-phase combining device.

A second aspect of the present application provides an antenna system. The system includes L transmit/receive sharing antenna pairs, where two antennas of each transmit/receive sharing antenna pair in the L transmit/receive sharing antenna pairs are symmetrically distributed on both sides of a same symmetry axis, and L is a positive integer. The system also includes 2L transmit/receive isolation devices, where the 2L transmit/receive isolation devices are one-to-one corresponding to all transmit/receive sharing antennas, and each transmit/receive isolation device is configured to isolate a receive signal and a transmit signal of each transmit/receive sharing antenna. The system also includes L dividing devices, where the L dividing devices are one-to-one corresponding to the L transmit/receive sharing antenna pairs, and each dividing device is configured to: divide one transmit signal into two transmit signals and separately send the two transmit signals to two antennas of a corresponding transmit/receive sharing antenna pair by using the transmit/receive isolation device. The system also includes L combining devices, where the L combining devices are one-to-one corresponding to the L transmit/receive sharing antenna pairs; each combining device is configured to combine two receive signals received by two antennas of a corresponding transmit/receive sharing antenna pair into one receive signal by using the transmit/receive isolation device; and the dividing device is an in-phase dividing device, and the combining device is an out-of-phase combining device; or the dividing device is an out-of-phase dividing device, and the combining device is an in-phase combining device.

The one or more technical solutions provided in the embodiments of the present application have at least the following technical effects or advantages.

In the embodiments of the present application, the antenna system includes: M transmit antenna pairs, where two transmit antennas of each transmit antenna pair in the M transmit antenna pairs are symmetrically distributed along a same symmetry axis and on both sides of the symmetry axis, and M is a positive integer; N receive antenna pairs, where two receive antennas of each receive antenna pair in the N receive antenna pairs are symmetrically distributed along the symmetry axis and on both sides of the symmetry axis, and N is a positive integer; M dividing devices, where the M dividing devices are one-to-one corresponding to the M transmit antenna pairs, and each dividing device is configured to: divide one transmit signal into two transmit signals and separately send the two transmit signals to two transmit antennas of a corresponding transmit antenna pair; and N combining devices, where the N combining devices are one-to-one corresponding to the N receive antenna pairs; each combining device is configured to combine two receive signals received by two receive antennas of a corresponding receive antenna pair into one receive signal; and the dividing device is an in-phase dividing device, and the combining device is an out-of-phase combining device; or the dividing device is an out-of-phase dividing device, and the combining device is an in-phase combining device. The transmit antenna pairs and the receive antenna pairs are symmetrically arranged along a same symmetry axis, that is, a coaxial symmetry axis. Therefore, any transmit antenna pair and any receive antenna pair form an isosceles trapezoid or a rectangle, and therefore in signals of all other transmit antenna pairs that are received by any receive antenna pair, a signal from each transmit antenna pair includes two in-phase (or out-of-phase) signals of equal amplitude, and the signals cancel each other out after being combined by using an out-of-phase (or in-phase) combining device. For a transmit/receive sharing antenna, multiple transmit/receive antenna pairs are arranged in a coaxial symmetrical manner. Therefore, spatial signal propagation paths between any two antenna pairs are totally symmetrical, three types of components of two self-interference signals received by any antenna pair are in-phase (or out-of-phase) and of equal amplitude, and the signals cancel each other out at a receive end by means of out-of-phase (or in-phase) combination. Therefore, strong interference to a receive signal from a transmit signal is reduced.

DETAILED DESCRIPTION OF ILLUSTRATIVE EMBODIMENTS

Figure 1:
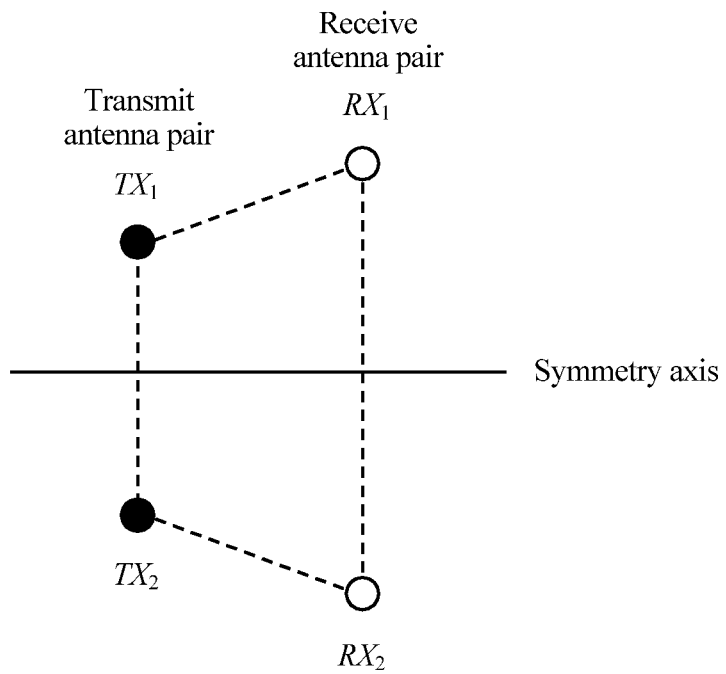
FIG. 1 is a configuration structural diagram of an antenna pair in a SISO scenario according to a first embodiment of the present application.

Embodiments of the present application provide an antenna system, so as to resolve a technical problem of relatively large antenna self-interference in the prior art.

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

The character "/" in this specification generally indicates an "or" relationship between the associated objects.

Composition of an antenna system in which a transmit antenna and a receive antenna are physically independent of each other in an embodiment of the present application is first described. The antenna system includes the following parts: M transmit antenna pairs, where two transmit antennas of each transmit antenna pair in the M transmit antenna pairs are symmetrically distributed along a same symmetry axis and on both sides of the symmetry axis, that is, the two transmit antennas of each transmit antenna pair are axial-symmetrically distributed along the symmetry axis, and M is a positive integer. The system also includes N receive antenna pairs, where two receive antennas of each receive antenna pair in the N receive antenna pairs are symmetrically distributed along the symmetry axis and on both sides of the symmetry axis, that is, the two receive antennas of each receive antenna pair are axial-symmetrically distributed along the symmetry axis, and N is a positive integer. The system also includes M dividing devices, where the M dividing devices are one-to-one corresponding to the M transmit antenna pairs, and each dividing device is configured to: divide one transmit signal into two transmit signals and separately send the two transmit signals to two transmit antennas of a corresponding transmit antenna pair. The system also includes N combining devices, where the N combining devices are one-to-one corresponding to the N receive antenna pairs; each combining device is configured to combine two receive signals received by two receive antennas of a corresponding receive antenna pair into one receive signal; and the dividing device is an in-phase dividing device, and the combining device is an out-of-phase combining device; or the dividing device is an out-of-phase dividing device, and the combining device is an in-phase combining device. In other words, phases of the two transmit signals obtained by using the dividing device are the same or opposite. Correspondingly, transmit signals with a same phase or opposite phases cancel each other out after passing through the out-of-phase combining device or the in-phase combining device.

An antenna pair being axial-symmetrically distributed along the symmetry axis indicates that two antennas of the antenna pair are axial-symmetrically distributed along the symmetry axis, that is, the two antennas are separately located on both sides of the symmetry axis, and distances between the two antennas and any point of the symmetry axis are equal. A distance between two antennas of each antenna pair may be equal or may be unequal. When the distance is unequal, antennas of different antenna pairs may be arranged in a same straight line column. For example, two antennas of a first antenna pair form a straight line column, and distances between the antennas and the symmetry axis are 2 mm. A straight line column formed by two antennas of a second antenna pair coincides with the straight line column of the first antenna pair. However, distances between the antennas and the symmetry axis are 3 mm. Therefore, the straight line column of the first antenna pair and the straight line column of the second antenna pair are a same straight line column, and four antennas are arranged in the straight line column.

For example, when both M and N are 1, the antenna system is applicable to a single-input single-output (SISO for short) system. Referring to FIG. 1, FIG. 1 is a possible distribution diagram of a transmit antenna pair and a receive antenna pair. In this embodiment, the symmetry axis is a horizontal symmetry axis. In a specific implementation process, the symmetry axis may also be a symmetry axis in a vertical direction. In this embodiment and the following embodiment, a power divider is used as an example of the dividing device, and a power combiner is used as an example of the combining device. In a practical application, another device such as a balun may be used.

The transmit antenna pair includes an antenna $TX_1$ and an antenna $TX_2$. The receive antenna pair includes an antenna $RX_1$ and an antenna $RX_2$. A distance between the transmit antenna pair may be equal or unequal to a distance between the receive antenna pair. In FIG. 1, the distance between the transmit antenna pair is unequal to the distance between the receive antenna pair. Therefore, the four antennas form an isosceles trapezoid. When the distance between the transmit antenna pair is equal to the distance between the receive antenna pair, the four antennas may form a rectangular.

Figure 2A:
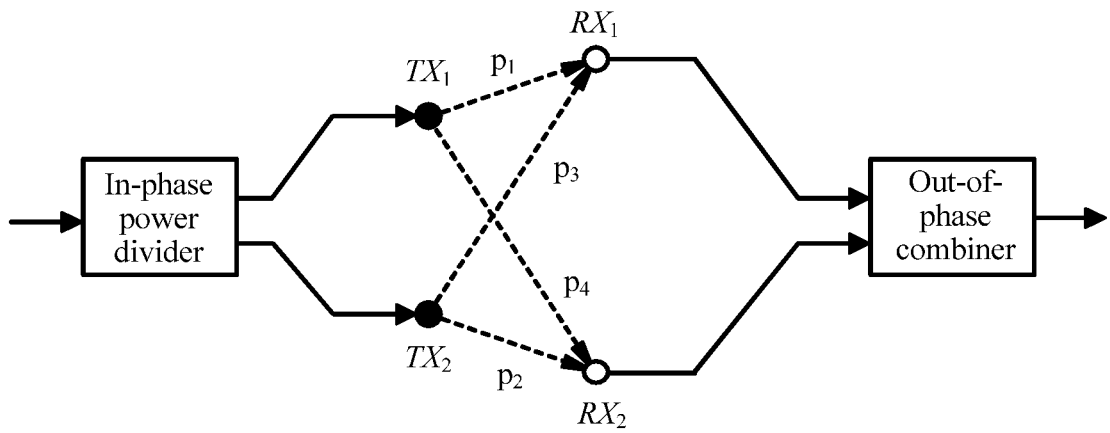
FIG. 2a and FIG. 2b are structural diagrams of an antenna system in a SISO scenario according to the first embodiment of the present application.

Then, refer to FIG. 2a. The antenna system further includes an in-phase power divider that is corresponding to a transmit antenna pair. The in-phase power divider is configured to: divide one transmit signal into two transmit signals and separately send the two transmit signals to an antenna $TX_1$ and an antenna $TX_2$ of the corresponding transmit antenna pair. A transmit signal sent to the antenna $TX_1$ and a transmit signal sent to the antenna $TX_2$ are in-phase and of equal amplitude. In other words, phases of the two transmit signals are the same, and a phase difference is 0.

Correspondingly, the antenna system further includes an out-of-phase combiner. The out-of-phase combiner is corresponding to a receive antenna pair and is configured to combine two receive signals received by two receive antennas of the corresponding receive antenna pair into one receive signal.

Then, after passing through transmission lines with an equal length, the two transmit signals are combined into one receive signal by the out-of-phase combiner. Continue to refer to FIG. 2a. A signal transmitted by the transmit antenna $TX_1$ arrives at the receive antenna $RX_1$ and the receive antenna $RX_2$ by respectively using space paths $p_1$ and $p_4$. Similarly, a signal transmitted by the transmit antenna $TX_2$ arrives at the receive antenna $RX_1$ and the receive antenna $RX_2$ by respectively using space paths $p_2$ and $p_3$ to form an interference signal. The transmit antenna pair and the receive antenna pair form an isosceles trapezoid. Therefore, two interference signals are in-phase and of equal amplitude when arriving at the receive antenna $RX_1$ and the receive antenna $RX_2$ by using channels of the space paths $p_1$ and $p_2$, and cancel each other out after passing through the out-of-phase combiner. Similarly, interference signals are also in-phase and of equal amplitude when arriving at the receive antenna $RX_1$ and the receive antenna $RX_2$ by using the space paths $p3$ and $p_4$, and therefore cancel each other out after passing through the out-of-phase combiner at a receive end. Therefore, interference to a receive signal from a transmit signal is avoided.

Figure 2B:
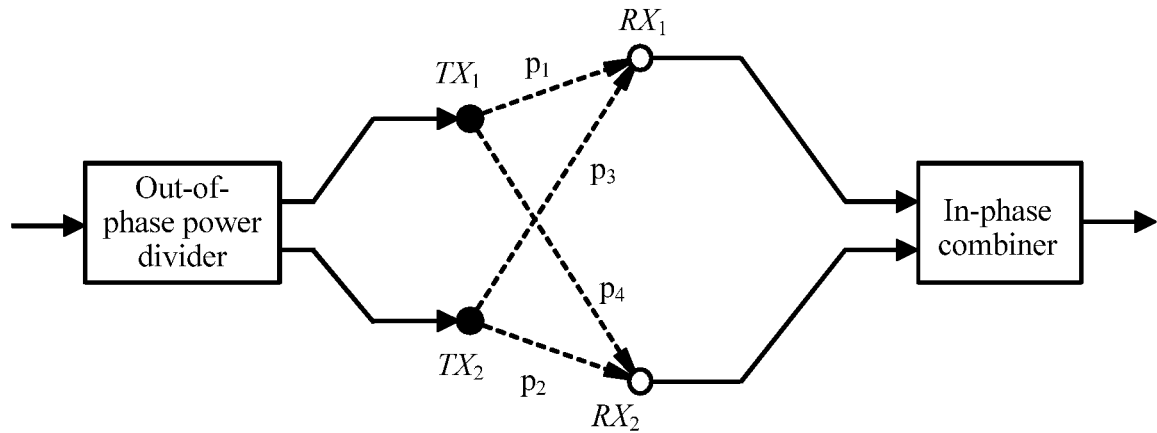

Certainly, in a practical application, what is corresponding to the transmit antenna pair may be an out-of-phase power divider, and phases of two transmit signals output by the out-of-phase power divider are opposite. What is corresponding to the receive antenna pair is an in-phase combiner, as shown in FIG. 2b. Therefore, two interference signals are out-of-phase and of equal amplitude when arriving at the receive antenna $RX_1$ and the receive antenna $RX_2$ by using the channels of the space paths $p_1$ and $p_2$, and cancel each other out after passing through the in-phase combiner. Similarly, interference signals are also out-of-phase and of equal amplitude when arriving at the receive antenna $RX_1$ and the receive antenna $RX_2$ by using the space paths $p3$ and $p_4$, and therefore cancel each other out after passing through the in-phase combiner at the receive end.

The following describes a case in which both M and N are greater than 1. In this case, the antenna system is applicable to a multiple input multiple output (English: Multiple Input Multiple Output, MIMO for short) scenario.

Figure 3:
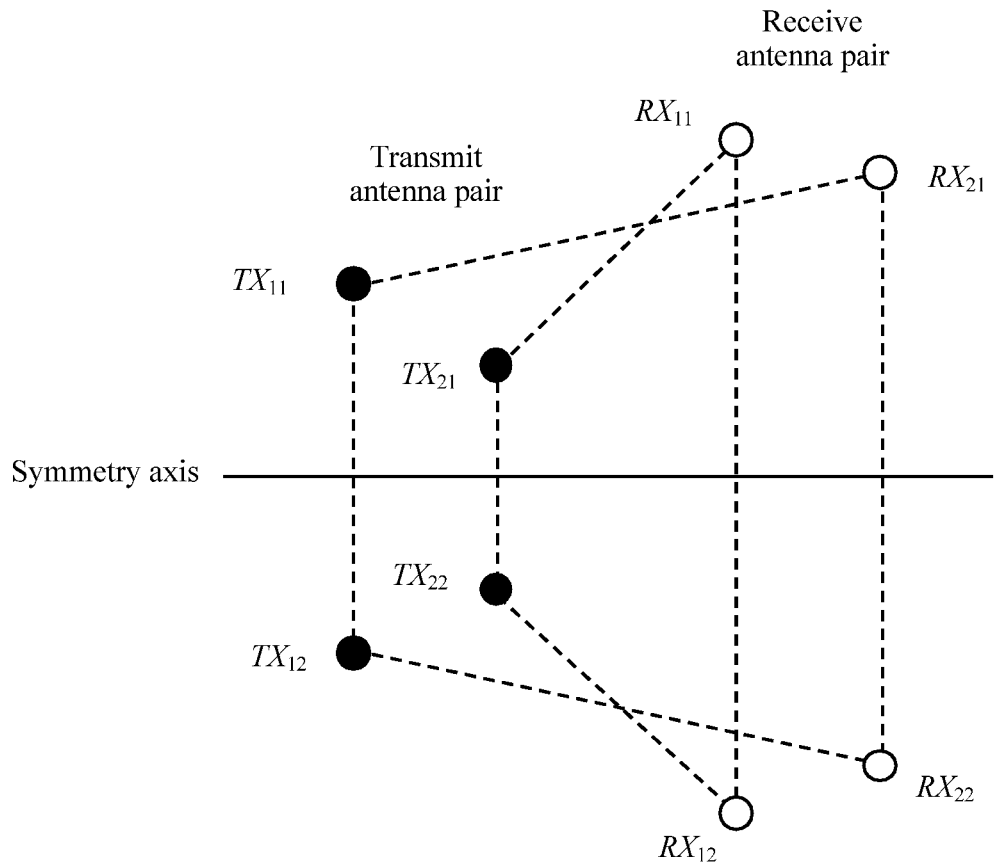
FIG. 3 is a configuration structural diagram of an antenna pair in a MIMO scenario according to the first embodiment of the present application.

That both M and N are 2 is used as an example. Referring to FIG. 3, a first transmit antenna pair includes an antenna $TX_{11}$ and an antenna $TX_{12}$. The antenna $TX_{11}$ and the antenna $TX_{12}$ are axial-symmetrically distributed along a symmetry axis. A second transmit antenna pair includes an antenna $TX_{21}$ and an antenna $TX_{22}$. The antenna $TX_{21}$ and the antenna $TX_{22}$ are axial-symmetrically distributed along the symmetry axis. A first receive antenna pair includes an antenna $RX_{11}$ and an antenna $RX_{12}$. The antenna $RX_{11}$ and the antenna $RX_{12}$ are axial-symmetrically distributed along the symmetry axis. A second receive antenna pair includes an antenna $RX_{21}$ and an antenna $RX_{22}$. The antenna $RX_{21}$ and the antenna $RX_{22}$ are axial-symmetrically distributed along the symmetry axis. In this embodiment, the first receive antenna pair and the first transmit antenna pair form an isosceles trapezoid. The first receive antenna pair and the second transmit antenna pair form an isosceles trapezoid. Similarly, the second receive antenna pair separately forms an isosceles trapezoid with the first transmit antenna pair and the second transmit antenna pair.

The antenna system further includes a first in-phase (out-of-phase) power divider (not shown in the figure). Output ends of the power divider are connected to the first transmit antenna pair. A first out-of-phase (in-phase) combiner is included. The first receive antenna pair is connected to input ends of the combiner. The antenna system further includes a second in-phase (out-of-phase) power divider. Output ends of the power divider are connected to the second transmit antenna pair. A second out-of-phase (in-phase) combiner is included. The second receive antenna pair is connected to input ends of the combiner.

The first receive antenna pair and the first transmit antenna pair form an isosceles trapezoid, and the first receive antenna pair and the second transmit antenna pair also form an isosceles trapezoid. Therefore, a received interference signal of the first transmit antenna pair includes two in-phase (out-of-phase) signals of equal amplitude. Then, the signals cancel each other out after being combined by using the first out-of-phase (in-phase) combiner connected to the first receive antenna pair. A received interference signal of the second transmit antenna pair also includes two in-phase (out-of-phase) signals of equal amplitude. Then, the signals cancel each other out after being combined by using the first out-of-phase (in-phase) combiner. Similarly, the second receive antenna pair and the first transmit antenna pair form an isosceles trapezoid, and the second receive antenna pair and the second transmit antenna pair also form an isosceles trapezoid. Therefore, a received interference signal of the first transmit antenna pair includes two in-phase (out-of-phase) signals of equal amplitude. Then, the signals cancel each other out after being combined by using the first out-of-phase (in-phase) combiner connected to the first receive antenna pair. A received interference signal of the second transmit antenna pair also includes two in-phase (out-of-phase) signals of equal amplitude. Then, the signals cancel each other out after being combined by using the first out-of-phase (in-phase) combiner.

Therefore, by analogy, for M transmit antenna pairs and N receive antenna pairs, any receive antenna pair and any transmit antenna pair form an isosceles trapezoid or a rectangular. In interference signals of all other transmit antenna pairs that are received by any receive antenna pair, a signal from each transmit antenna pair includes two in-phase (out-of-phase) signals of equal amplitude, and therefore the signals cancel each other out after being combined by using an out-of-phase (in-phase) combiner. Therefore, antenna self-interference can be canceled in the antenna system in this embodiment.

When the antenna system includes relatively more transmit antenna pairs and receive antenna pairs, each antenna pair may be configured in multiple manners. Several specific examples are used for description in the following.

In a first example, two transmit antennas of each transmit antenna pair are arranged in a straight line to form a transmit antenna column. Each transmit antenna column includes transmit antennas of at least one transmit antenna pair. Therefore, transmit antennas of M transmit antenna pairs are arranged in a straight line to form at least one transmit antenna column. Similarly, receive antennas of N receive antenna pairs are arranged in a straight line to form at least one receive antenna column. The at least one transmit antenna column and the at least one receive antenna column are alternately arranged. For details, refer to FIG. 4a. Black solid dots indicate a transmit antenna pair, and white circles indicate a receive antenna pair. It may be learned from FIG. 4a that in a symmetry axis direction, a transmit antenna column of a transmit antenna pair and a receive antenna column of a receive antenna pair are alternately arranged. For example, from left to right, there are successively a transmit antenna column formed by a transmit antenna pair, a receive antenna column formed by a receive antenna pair, a transmit antenna column formed by a transmit antenna pair, and a receive antenna column formed by a receive antenna pair.

Figure 4A:
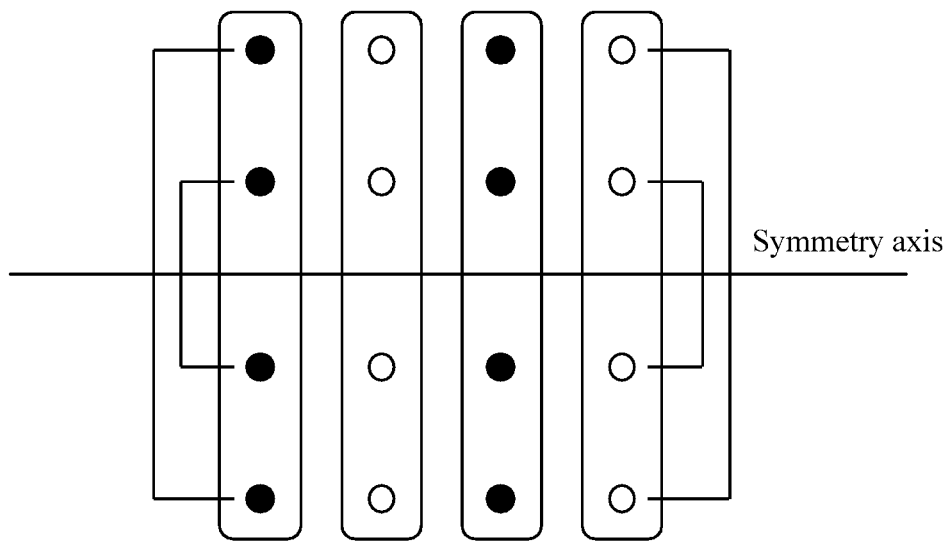
FIG. 4a to FIG. 4d are different configuration structural diagrams of an antenna pair in a MIMO scenario according to the first embodiment of the present application.
Figure 4B:
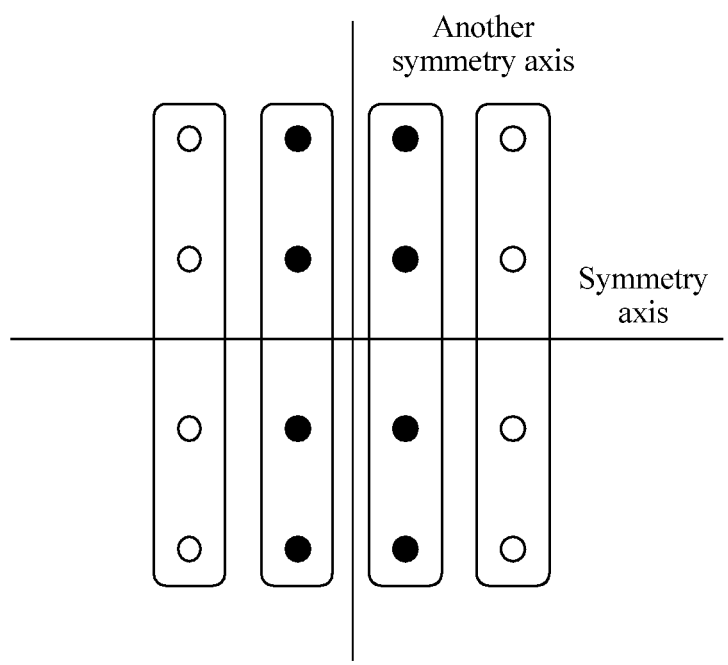

In each antenna column, there may be only one antenna pair, or may be multiple antenna pairs. As shown in FIG. 4a, each antenna column includes two antenna pairs. Optionally, antennas in a same antenna column may be of a same type, that is, either receive antennas or transmit antennas. Optionally, as shown in FIG. 4b, antennas in a same antenna column may be of different types, that is, may include a receive antenna and a transmit antenna.

In a second example, columns formed by a transmit antenna pair and/or a receive antenna pair are symmetrically distributed along another axis that is perpendicular to a symmetry axis. Specifically, two transmit antennas of each transmit antenna pair are arranged in a straight line to form a transmit antenna column, and M transmit antenna pairs are arranged in a straight line to form an even number of transmit antenna columns. Two receive antennas of each receive antenna pair are arranged in a straight line to form a receive antenna column, and N receive antenna pairs are arranged in a straight line to form an even number of receive antenna columns. The even number of transmit antenna columns are distributed on both sides of the another symmetry axis that is perpendicular to the symmetry axis. The even number of receive antenna columns are distributed on both sides of the another symmetry axis. For details, refer to FIG. 4b. Black solid dots indicate a transmit antenna pair, and white circles indicate a receive antenna pair. In this embodiment, transmit antenna columns of transmit antenna pairs are symmetrically distributed along another symmetry axis and on both sides of the another symmetry axis. Similarly, receive antenna columns of receive antenna pairs are symmetrically distributed along the another symmetry axis and on both sides of the another symmetry axis. A same antenna column may include antennas of different types, that is, a pair of symmetrical transmit antenna columns in an even number of transmit antenna columns respectively coincides with a pair of symmetrical receive antenna columns in receive antenna columns. In this case, a distance between a transmit antenna and the symmetry axis is unequal to a distance between a receive antenna and the symmetry axis.

Figure 4C:
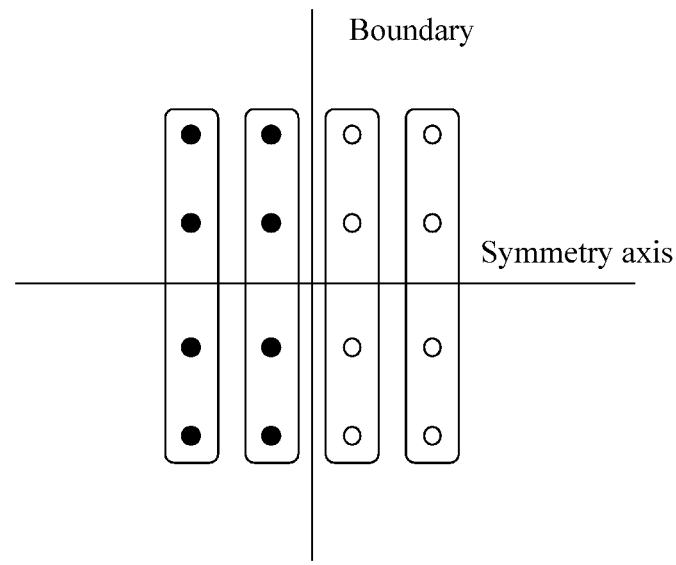

In a third example, a transmit antenna pair and a receive antenna pair are distributed on both sides of a boundary that is perpendicular to a symmetry axis according to an antenna type. Specifically, M transmit antenna pairs are distributed on one side of the boundary, and N receive antenna pairs are distributed on the other side of the boundary. For details, refer to FIG. 4c. Black solid dots indicate a transmit antenna pair, and white circles indicate a receive antenna pair. The transmit antenna pair and the receive antenna pair are distributed on both sides of the boundary according to the antenna type. For example, in FIG. 4c, from left to right, there are two columns of transmit antenna pairs and two columns of receive antenna pairs.

Optionally, two transmit antennas of each transmit antenna pair form one transmit antenna column, transmit antenna columns formed by at least two transmit antenna pairs coincide. However, a distance between each pair of transmit antennas of the at least two transmit antenna pairs and the symmetry axis is unequal to each other. For example, in this embodiment, transmit antenna columns formed by two transmit antenna pairs coincide, that is, two transmit antennas are arranged in one transmit antenna column. However, distances between antennas of the two transmit antennas and the symmetry axis are unequal.

In the foregoing various arrangement manners, an antenna may be extended in a symmetry axis direction, or an antenna may be extended in a direction that is perpendicular to a symmetry axis. Therefore, a spatial multiplexing capability is improved.

Figure 4D:
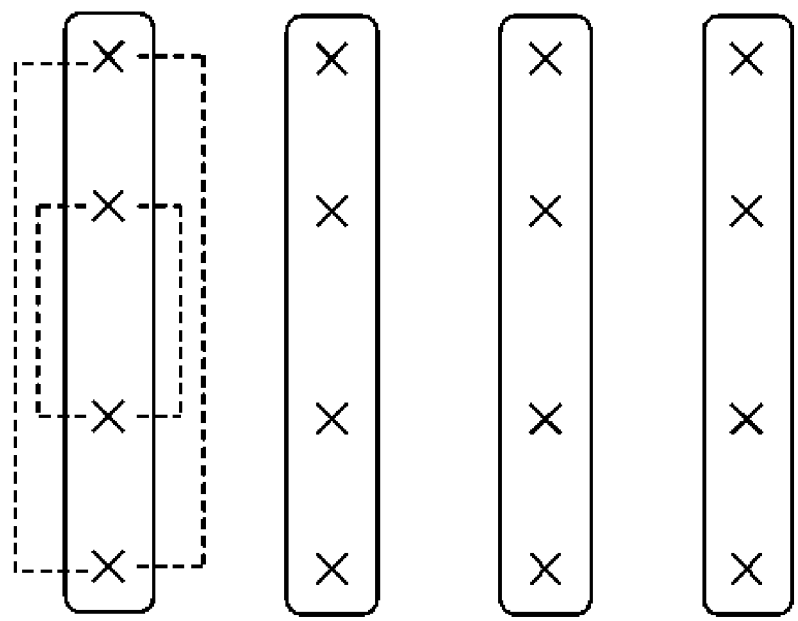

In a fourth example, transmit antennas in a transmit antenna pair and receive antennas in a receive antenna pair are arranged in a cross-polarized manner in a same straight line that is perpendicular to a symmetry axis. For details, refer to FIG. 4d. A tilting line from a lower left corner to an upper right corner indicates a transmit antenna, and a tilting line from an upper left corner to a lower right corner indicates a receive antenna. Each straight line may include one pair of receive antennas and one pair of transmit antennas, or may include multiple pairs of receive antennas and multiple pairs of transmit antennas. When there are relatively more antenna pairs, the antenna pairs may be arranged in multiple columns in a symmetry axis direction. In the cross-polarized manner, isolation between two antennas in a cross-polarized antenna pair may be increased.

It may be learned that any transmit antenna pair and any receive antenna pair in FIG. 4a to FIG. 4d form an isosceles trapezoid or a rectangular. Therefore, in signals of all transmit antenna pairs that are received by any receive antenna pair, a signal that comes from each transmit antenna pair includes two in-phase (or out-of-phase) signals of equal amplitude, and therefore the signals cancel each other out after being combined by using an out-of-phase (or in-phase) combiner.

In a practical application, a configuration structure of an antenna array element shown in FIG. 4a to FIG. 4d is the same as an array element configuration structure used by a frequently-used panel antenna (Panel Antenna) in a cellular network system. The panel antenna has characteristics such as a small antenna area, and being mature and reliable. Therefore, an antenna pair in this embodiment of the present application may be formed by configuring the panel antenna. Specifically, the panel antenna includes P columns of antennas, and Q array elements are used in each column of antenna, where P is a positive integer, and Q is an even number. Each column of antenna is either configured as transmit antennas or configured as receive antennas. Each column is symmetrical in a manner of a central symmetry axis. The array elements in each column of antenna are combined into Q/2 transmit antenna pairs or receive antenna pairs. Division and combination are respectively performed on each transmit antenna pair and each receive antenna pair by using the foregoing dividing device or combining device, so that signals of each transmit antenna pair that are received by any receive antenna pair cancel each other out, and isolation between transmission and reception is effectively improved.

The following describes a case in which a transmit antenna and a receive antenna are physically a same element, that is, composition of an antenna system in which transmission and reception share an antenna. The antenna system includes the following parts: L transmit/receive sharing antenna pairs, where two antennas of each transmit/receive sharing antenna pair in the L transmit/receive sharing antenna pairs are symmetrically distributed along a same symmetry axis and on both sides of the symmetry axis, that is, each transmit/receive sharing antenna pair is axial-symmetrically distributed along the symmetry axis, and L is a positive integer; 2L transmit/receive isolation devices, where the 2L transmit/receive isolation devices are one-to-one corresponding to all transmit/receive sharing antennas, and each transmit/receive isolation device is configured to isolate a receive signal and a transmit signal of each transmit/receive sharing antenna; L dividing devices, where the L dividing devices are one-to-one corresponding to the L transmit/receive sharing antenna pairs, and each dividing device is configured to: divide one transmit signal into two transmit signals and separately send the two transmit signals to two antennas of a corresponding transmit/receive sharing antenna pair by using the transmit/receive isolation device; and L combining devices, where the L combining devices are one-to-one corresponding to the L transmit/receive sharing antenna pairs, and each combining device is configured to combine two receive signals received by two antennas of a corresponding transmit/receive sharing antenna pair into one receive signal by using the transmit/receive isolation device; and the dividing device is an in-phase dividing device, and the combining device is an out-of-phase combining device; or the dividing device is an out-of-phase dividing device, and the combining device is an in-phase combining device.

Meanings of the dividing device and the combining device are the same as those in the foregoing embodiment, and therefore details are not described herein.

Optionally, transmit/receive sharing is implemented in a transmit/receive sharing antenna by using a transmit/receive isolation device such as a circulator, a coupler, or a balun. This part is content well known by a person skilled in the art, and therefore details are not described herein.

Optionally, the two antennas of each transmit/receive sharing antenna pair form at least one transmit/receive sharing antenna column, transmit/receive sharing antenna columns formed by at least two transmit/receive sharing antenna pairs coincide. However, a distance between each pair of transmit/receive sharing antennas of the at least two transmit/receive sharing antenna pairs and the symmetry axis is unequal to each other.

Certainly, transmit/receive sharing antenna columns formed by all transmit/receive sharing antenna pairs may be pairwise independent.

Figure 5:
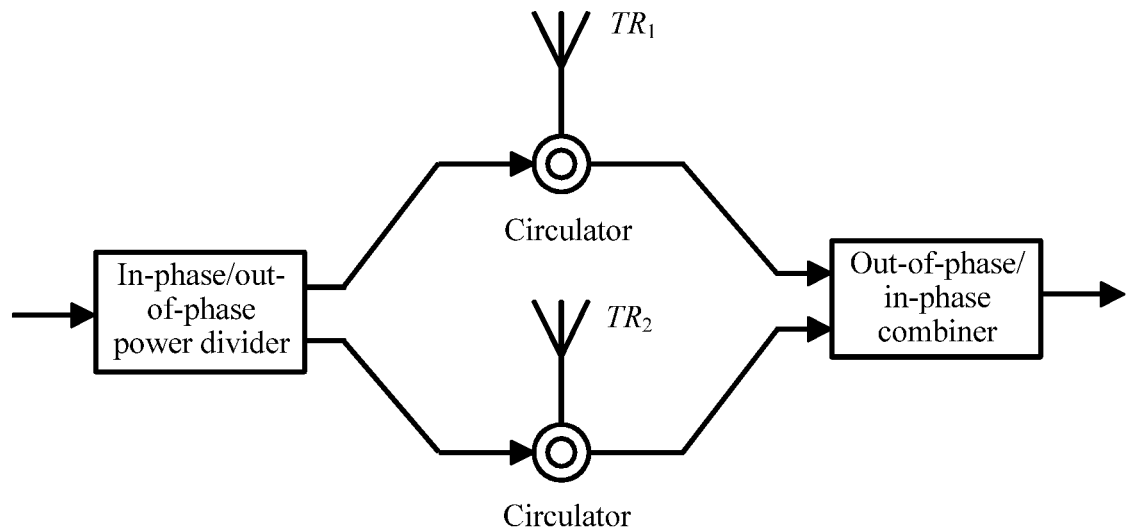
FIG. 5 is a configuration structural diagram of an antenna pair in a SISO scenario according to a second embodiment of the present application.

Referring to FIG. 5, FIG. 5 is a structural diagram of an antenna system when L is 1. In this case, the antenna system is applicable to a SISO scenario. The antenna system includes a first transmit/receive sharing antenna $TR_1$ and a second transmit/receive sharing antenna $TR_2$. Output ends of an in-phase/out-of-phase power divider are respectively connected to the first transmit/receive sharing antenna $TR_1$ and the second transmit/receive sharing antenna $TR_2$. The power divider divides one transmit signal into two signals and separately sends the two signals to the first transmit/receive sharing antenna $TR_1$ and the second transmit/receive sharing antenna $TR_2$. Phases of the two transmit signals are the same or opposite. Output ends of the first transmit/receive sharing antenna $TR_1$ and the second transmit/receive sharing antenna $TR_2$ are respectively connected to input ends of an out-of-phase/in-phase combiner. The combiner combines the two output signals received by the first transmit/receive sharing antenna $TR_1$ and the second transmit/receive sharing antenna $TR_2$ into one output signal.

Figure 6:
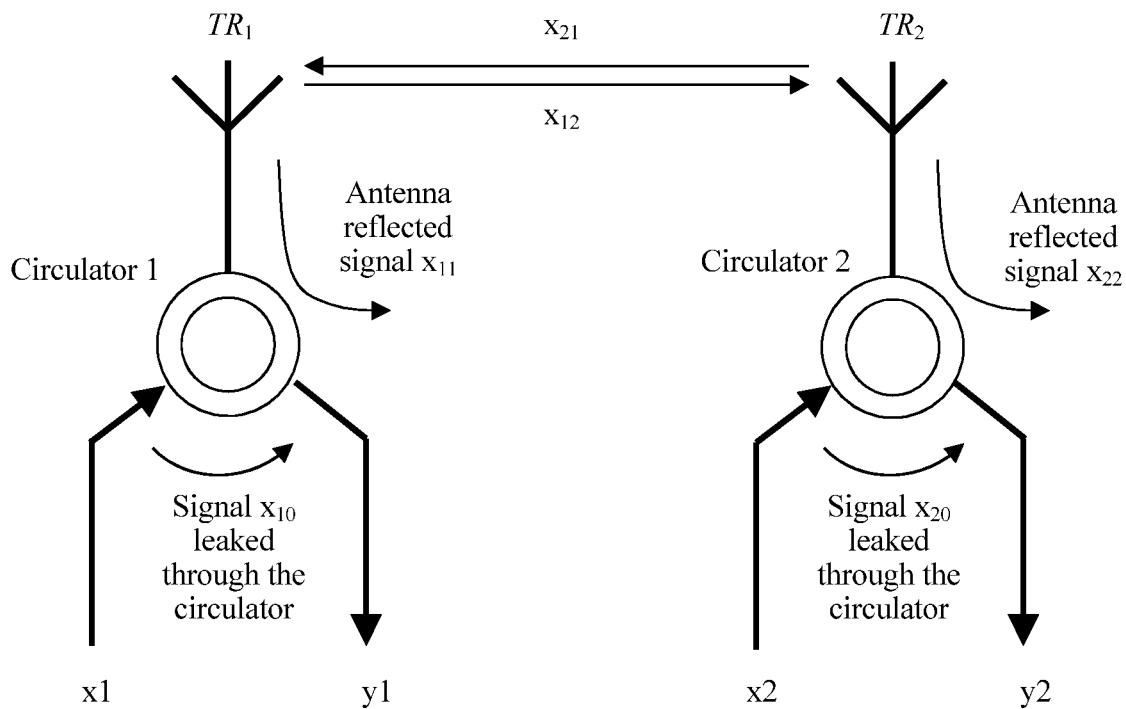
FIG. 6 is a schematic diagram of composition of a self-interference signal of each receiving branch according to the second embodiment of the present application.

A self-interference signal received by each receiving branch mainly includes three types of components: a signal, of a transmitting branch that shares a transmit/receive sharing antenna with the receiving branch, that is leaked to the receiving branch through a transmit/receive isolation device, an antenna echo transmit signal, and a signal from another antenna that propagates through space. Then, referring to FIG. 6, FIG. 6 is a schematic diagram of a self-interference signal when transmission and reception share an antenna. As shown in FIG. 6, a self-interference signal included in a receive signal $y_1$ mainly includes three components: a signal $x_{10}$, of a transmit signal $x_1$, that is leaked to a receiving branch through a circulator 1, an echo reflected signal $x_{11}$ formed by the transmit signal $x_1$ by using the antenna $TR_1$, and a self-interference signal $x_{21}$ corresponding to a transmit signal $x_2$ from the antenna $TR_2$. Similarly, a self-interference signal included in a receive signal $y_2$ mainly includes three components: a signal $x_{20}$, of the transmit signal $x_2$, that is leaked to a receiving branch through the circulator 1, an echo reflected signal $x_{22}$ formed by the transmit signal $x_1$ by using the antenna $TR_2$, and a self-interference signal $x_{12}$ corresponding to the transmit signal $x_1$ from the antenna $TR_1$.

When a transmit/receive isolation device, an antenna, and the like that are used have a same electrical characteristic, three types of components of a self-interference signal corresponding to the antenna pair $TR_1$ and $TR_2$ are all in-phase (out-of-phase) signals of equal amplitude. Therefore, the signals cancel each other out after being combined by using an out-of-phase (in-phase) combiner.

Figure 7:
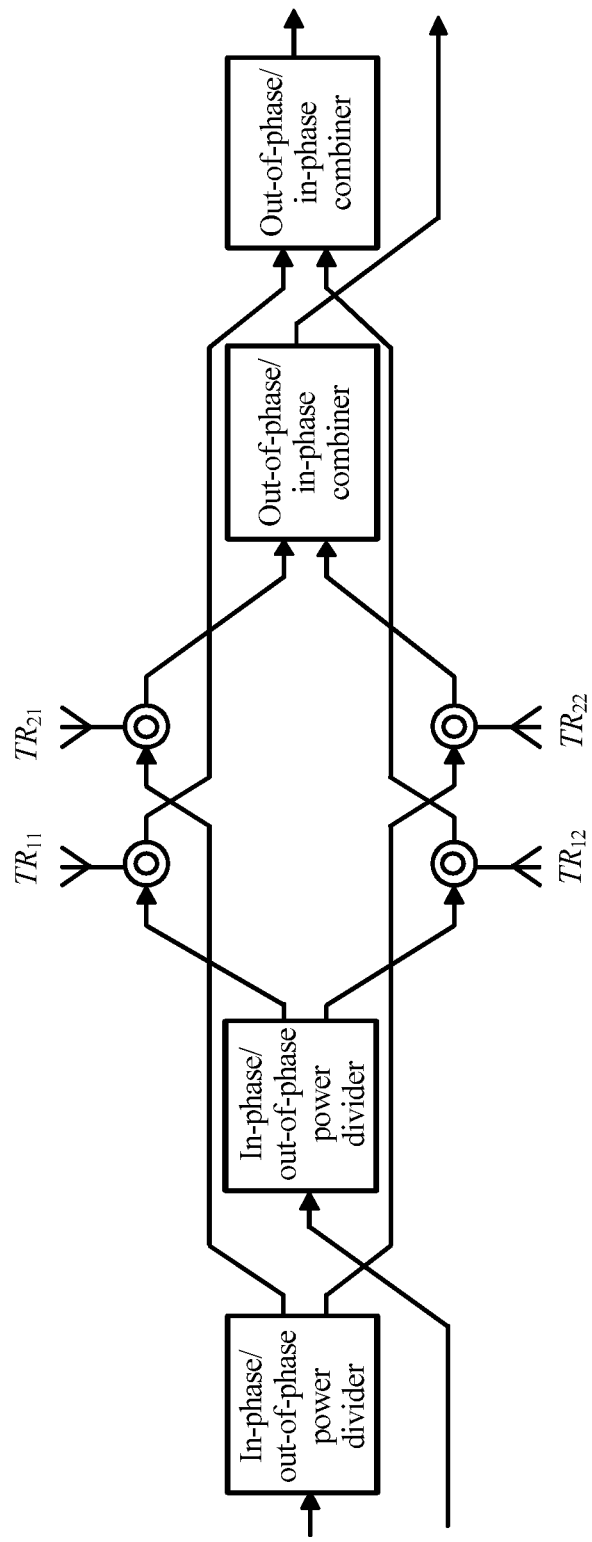
FIG. 7 is a structural diagram of an antenna system in a MIMO scenario according to the second embodiment of the present application.

The following describes a structural diagram of an antenna system when L is 2. The antenna system may be applicable to a MIMO scenario. Referring to FIG. 7, a difference between FIG. 7 and FIG. 5 lies in that in this embodiment, a second transmit/receive sharing antenna pair is included in addition to a first transmit/receive sharing antenna pair: an antenna $TR_{11}$ and an antenna $TR_{12}$. The second transmit/receive sharing antenna pair includes an antenna $TR_{21}$ and an antenna $TR_{22}$.

For the first transmit/receive sharing antenna pair: the antenna $TR_{11}$ and the antenna $TR_{12}$, three types of components of a self-interference signal corresponding to the antenna $TR_{11}$ and the antenna $TR_{12}$ are all in-phase (out-of-phase) signals of equal amplitude. Therefore, the signals cancel each other out after being combined by using an out-of-phase (in-phase) combiner. Similarly, for the second transmit/receive sharing antenna pair: the antenna $TR_{21}$ and the antenna $TR_{22}$, three types of components of a self-interference signal corresponding to the antenna $TR_{21}$ and the antenna $TR_{22}$ are all in-phase (out-of-phase) signals of equal amplitude. Therefore, the signals cancel each other out after being combined by using an out-of-phase (in-phase) combiner.

When L is greater than 2, by analogy, multiple transmit/receive sharing antenna pairs are configured in a coaxial symmetrical manner, and spatial signal propagation paths between any two transmit/receive sharing antenna pairs are totally symmetrical. Therefore, three types of components of two self-interference signals received by any transmit/receive sharing antenna pair are in-phase (or out-of-phase) and of equal amplitude. The three types of components are a signal, of a transmitting branch that shares a transmit/receive sharing antenna with a receiving branch, that is leaked to the receiving branch through a transmit/receive isolation device, an antenna echo reflected signal, and a signal from another antenna that propagates through space. Therefore, the signals cancel each other out after being combined by using an out-of-phase (or in-phase) combining device at a receive end.

The antenna system in this embodiment of the present application may implement self-interference cancellation in a full-duplex system, or may be applied to a system such as an FDD system. For example, the antenna system may substitute for a duplexer in the FDD system or reduce an indicator requirement of the duplexer. The antenna system in this embodiment of the present application has high isolation between transmission and reception, low complexity, and a small transmit power loss, and may reuse a panel antenna structure in an existing cellular system.

A person skilled in the art may understand that, limited by a manufacturing technology and machining precision, an analog device such as an antenna, a dividing device, a combining device, or a transmit/receive isolation device, and a circuit that are used in the present invention cannot have ideally and totally same electrical characteristics in an actual system. Therefore, a description such as "equal amplitude", "in-phase", or "out-of-phase" used in the present application is in principle. In actual implementation, a problem that an actual device and a circuit are not ideal and do not match may be overcome by adding some auxiliary circuits such as an adjustable attenuator and an adjustable phase shifter. However, regardless of a type of a used auxiliary circuit, this falls within the protection scope of the present application.

The one or more technical solutions provided in the embodiments of the present application have at least the following technical effects or advantages.

In the embodiments of the present application, the antenna system includes: M transmit antenna pairs, where two transmit antennas of each transmit antenna pair in the M transmit antenna pairs are symmetrically distributed along a same symmetry axis and on both sides of the symmetry axis, and M is a positive integer; N receive antenna pairs, where two receive antennas of each receive antenna pair in the N receive antenna pairs are symmetrically distributed along the symmetry axis and on both sides of the symmetry axis, and N is a positive integer; M dividing devices, where the M dividing devices are one-to-one corresponding to the M transmit antenna pairs, and each dividing device is configured to: divide one transmit signal into two transmit signals and separately send the two transmit signals to two transmit antennas of a corresponding transmit antenna pair; and N combining devices, where the N combining devices are one-to-one corresponding to the N receive antenna pairs; each combining device is configured to combine two receive signals received by two receive antennas of a corresponding receive antenna pair into one receive signal; and the dividing device is an in-phase dividing device, and the combining device is an out-of-phase combining device; or the dividing device is an out-of-phase dividing device, and the combining device is an in-phase combining device. The transmit antenna pairs and the receive antenna pairs are symmetrically arranged along a same symmetry axis, that is, a coaxial symmetry axis. Therefore, any transmit antenna pair and any receive antenna pair form an isosceles trapezoid or a rectangle, and therefore in signals of all other transmit antenna pairs that are received by any receive antenna pair, a signal from each transmit antenna pair includes two in-phase (or out-of-phase) signals of equal amplitude, and the signals cancel each other out after being combined by using an out-of-phase (or in-phase) combining device. For a transmit/receive sharing antenna, multiple transmit/receive antenna pairs are arranged in a coaxial symmetrical manner. Therefore, spatial signal propagation paths between any two antenna pairs are totally symmetrical, three types of components of two self-interference signals received by any antenna pair are in-phase (or out-of-phase) and of equal amplitude, and the signals cancel each other out at a receive end by means of out-of-phase (or in-phase) combination. Therefore, strong interference to a receive signal from a transmit signal is reduced.

Obviously, a person skilled in the art can make various modifications and variations to the present application without departing from the scope of the present application. The present application is intended to cover these modifications and variations of the present application provided that they fall within the scope of protection defined by the following claims and their equivalent technologies.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An antenna system, comprising:
    M transmit antenna pairs, wherein two transmit antennas of each transmit antenna pair in the M transmit antenna pairs are symmetrically distributed on both sides of a same symmetry axis, and M is a positive integer greater than 1;
    N receive antenna pairs, wherein two receive antennas of each receive antenna pair in the N receive antenna pairs are symmetrically distributed on both sides of the symmetry axis, and N is a positive integer greater than 1;
    M in-phase dividing devices, wherein the M in-phase dividing devices are in a one-to-one correspondence with the M transmit antenna pairs, and each in-phase dividing device of the M in-phase dividing devices is configured to divide one transmit signal into two transmit signals and separately send the two transmit signals to two transmit antennas of a corresponding transmit antenna pair; and
    N out-of-phase combining devices, wherein the N out-of-phase combining devices are in a one-to-one correspondence with the N receive antenna pairs, wherein each out-of-phase combining device of the N out-of-phase combining devices is configured to combine two receive signals received by two receive antennas of a corresponding receive antenna pair into one receive signal; and wherein a transmission path includes an in-phase dividing device of the M in-phase dividing devices and an out-of-phase combining device of the N out-of-phase combining devices.

2. The antenna system according to claim 1, wherein transmit antennas of the M transmit antenna pairs are arranged in a straight line to form at least one transmit antenna column, and each transmit antenna column comprises transmit antennas of a transmit antenna pair of the M transmit antenna pairs;

wherein receive antennas of the N receive antenna pairs are arranged in a straight line to form at least one receive antenna column, and each receive antenna column comprises receive antennas of a receive antenna pair of the N receive antenna pairs; and the transmit antenna column and the receive antenna column are alternately arranged.

3. The antenna system according to claim 1, wherein transmit antennas of the M transmit antenna pairs are arranged in a straight line to form an even number of transmit antenna columns, and the transmit antenna columns are symmetrically distributed on both sides of another symmetry axis that is perpendicular to the symmetry axis; and wherein receive antennas of the N receive antenna pairs are arranged in a straight line to form an even number of receive antenna columns, and the receive antenna columns are symmetrically distributed on both sides of the another symmetry axis.

4. The antenna system according to claim 3, wherein a pair of symmetrical transmit antenna columns in the even number of transmit antenna columns respectively coincides with a pair of symmetrical receive antenna columns in the receive antenna columns, and a distance between a transmit antenna in the pair of symmetrical transmit antenna columns and the symmetry axis is different from a distance between a receive antenna in the pair of symmetrical receive antenna columns and the symmetry axis.

5. The antenna system according to claim 1, wherein the M transmit antenna pairs are distributed on one side of a boundary that is perpendicular to the symmetry axis, and the N receive antenna pairs are distributed on the other side of the boundary.

6. The antenna system according to claim 5, wherein the two transmit antennas of each transmit antenna pair form one transmit antenna column, transmit antenna columns formed by a plurality of transmit antenna pairs coincide, and a distance between each pair of transmit antennas of the plurality of transmit antenna pairs and the symmetry axis is unequal to each other.

7. The antenna system according to claim 1, wherein the transmit antennas in the transmit antenna pair and the receive antennas in the receive antenna pair are arranged in a cross-polarized manner in a same straight line that is perpendicular to the symmetry axis.

8. The antenna system according to claim 1, further comprising:

a panel antenna configured to form the M transmit antenna pairs and the N receive antenna pairs, wherein the panel antenna is comprised by a cellular network system.

* * * * *